(12) United States Patent
Zander et al.

(10) Patent No.: US 11,014,544 B2
(45) Date of Patent: May 25, 2021

(54) HYDRAULIC BLOCK FOR A HYDRAULIC ASSEMBLY OF A SLIP CONTROL SYSTEM OF A HYDRAULIC VEHICLE BRAKE SYSTEM

(71) Applicant: Robert Bosch GmbH, Stuttgart (DE)

(72) Inventors: Thomas Zander, Oberstaufen (DE); Michael Loeffler, Oberstaufen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/470,440

(22) PCT Filed: Oct. 19, 2017

(86) PCT No.: PCT/EP2017/076709
§ 371 (c)(1),
(2) Date: Jun. 17, 2019

(87) PCT Pub. No.: WO2018/114090
PCT Pub. Date: Jun. 28, 2018

(65) Prior Publication Data
US 2020/0094800 A1 Mar. 26, 2020

(30) Foreign Application Priority Data

Dec. 21, 2016 (DE) .................... 10 2016 225 761.7

(51) Int. Cl.
*B60T 8/36* (2006.01)
*B60T 8/40* (2006.01)
(Continued)

(52) U.S. Cl.
CPC ............ *B60T 8/4031* (2013.01); *B60T 8/368* (2013.01); *B60T 8/4836* (2013.01); *B60T 17/04* (2013.01);
(Continued)

(58) Field of Classification Search
CPC ...... B60T 8/368; B60T 8/4031; B60T 8/4836; B60T 17/02; B60T 17/04; B60T 17/043; F15B 13/0814; F15B 2211/625
See application file for complete search history.

(56) References Cited

U.S. PATENT DOCUMENTS

| | | | | |
|---|---|---|---|---|
| 5,402,824 A | * | 4/1995 | Hosoya | B60T 8/362 137/454.2 |
| 5,681,097 A | * | 10/1997 | Tackett | B60T 8/36 137/454.2 |

(Continued)

FOREIGN PATENT DOCUMENTS

| | | |
|---|---|---|
| CN | 1677837 A | 10/2005 |
| CN | 104870278 A | 8/2015 |

(Continued)

OTHER PUBLICATIONS

International Search Report corresponding to PCT Application No. PCT/EP2017/076709, dated Jan. 25, 2018 (German and English language document) (7 pages).

*Primary Examiner* — Thomas W Irvin
(74) *Attorney, Agent, or Firm* — Maginot, Moore & Beck LLP

(57) ABSTRACT

A hydraulic block of a slip control system of a hydraulic vehicle brake system includes receptacles for the hydraulic accumulator and receptacles for outlet valves arranged on opposite sides of each other in the hydraulic block. The sides of the hydraulic block, which comprise the receptacles for the outlet valves and the hydraulic accumulators, are connected to one another by bores perpendicular thereto.

7 Claims, 1 Drawing Sheet

(51) Int. Cl.
  *B60T 8/48* (2006.01)
  *F15B 1/04* (2006.01)
  *B60T 17/04* (2006.01)
  *F15B 13/08* (2006.01)

(52) U.S. Cl.
  CPC ............ *B60T 17/043* (2013.01); *F15B 1/04* (2013.01); *F15B 13/0814* (2013.01); *F15B 2211/625* (2013.01)

(56) References Cited

U.S. PATENT DOCUMENTS

| | | | | |
|---|---|---|---|---|
| 6,398,315 | B1* | 6/2002 | Dinkel | B60T 8/368 303/113.1 |
| 6,688,707 | B1* | 2/2004 | Dinkel | B60T 8/368 303/119.3 |
| 7,148,648 | B2* | 12/2006 | Okano | B60T 8/368 318/638 |
| 7,322,658 | B2* | 1/2008 | Hinz | B60T 8/368 303/116.4 |
| 7,448,698 | B2* | 11/2008 | Koyama | B60T 8/368 303/10 |
| 8,366,208 | B2* | 2/2013 | Grundl | B60T 13/686 303/119.3 |
| 8,500,215 | B2* | 8/2013 | Gastauer | B60T 8/368 303/10 |
| 8,523,295 | B2* | 9/2013 | Bareiss | B60T 8/368 303/119.3 |
| 8,622,486 | B2* | 1/2014 | Tandler | B60T 8/368 303/10 |
| 8,702,182 | B2* | 4/2014 | Fischbach-Borazio | B60T 8/368 303/119.3 |
| 9,470,247 | B2* | 10/2016 | Alaze | B60T 8/368 |
| 9,517,757 | B2* | 12/2016 | Schlitzkus | B60T 8/368 |
| 9,586,565 | B2* | 3/2017 | Fellmeth | B60T 8/368 |
| 9,688,256 | B2* | 6/2017 | Weh | B60T 8/368 |
| 9,783,179 | B2* | 10/2017 | Schlotter | B60T 8/4872 |
| 9,868,423 | B2* | 1/2018 | Weh | F04B 9/047 |
| 10,093,294 | B2* | 10/2018 | Mayr | B60T 8/368 |
| 10,308,232 | B2* | 6/2019 | Mayr | B60T 8/368 |
| 10,407,040 | B2* | 9/2019 | Jeon | B60T 13/146 |
| 10,625,722 | B2* | 4/2020 | Weh | B23Q 3/06 |
| 2005/0218856 | A1* | 10/2005 | Okano | B60T 8/4031 318/638 |
| 2006/0055232 | A1* | 3/2006 | Koyama | B60T 8/3685 303/10 |
| 2008/0258544 | A1* | 10/2008 | Iyatani | F15B 13/0814 303/10 |
| 2008/0298982 | A1* | 12/2008 | Pabst | B60T 8/368 417/273 |
| 2010/0207446 | A1* | 8/2010 | Tandler | B60T 8/368 303/10 |
| 2010/0276925 | A1* | 11/2010 | Bareiss | F15B 13/0814 285/125.1 |
| 2011/0036434 | A1* | 2/2011 | Fischbach-Borazio | B60T 8/368 137/861 |
| 2011/0062773 | A1* | 3/2011 | Misunou | F04C 2/10 303/6.01 |
| 2012/0326493 | A1* | 12/2012 | Okamura | B60T 8/368 303/10 |
| 2013/0276442 | A1* | 10/2013 | Schlotter | B60T 17/06 60/533 |
| 2013/0319562 | A1* | 12/2013 | Weh | F15B 13/0803 137/884 |
| 2014/0062177 | A1* | 3/2014 | Fellmeth | B60T 13/686 303/6.01 |
| 2014/0345720 | A1* | 11/2014 | Alaze | B60T 13/686 137/561 A |
| 2015/0298675 | A1* | 10/2015 | Mayr | B60T 8/4081 92/169.1 |
| 2015/0314760 | A1* | 11/2015 | Weh | B60T 8/368 137/884 |
| 2015/0321650 | A1* | 11/2015 | Schlitzkus | B60T 8/4872 137/78.1 |
| 2016/0280197 | A1* | 9/2016 | Mayr | B60T 17/02 |
| 2017/0072925 | A1* | 3/2017 | Mayr | B60T 8/368 |
| 2018/0056955 | A1* | 3/2018 | Weh | B60T 8/368 |
| 2019/0031164 | A1* | 1/2019 | Tandler | B60T 8/368 |
| 2019/0210576 | A1* | 7/2019 | Zander | F15B 13/0814 |
| 2020/0031327 | A1* | 1/2020 | Mayr | F16K 27/003 |
| 2020/0070798 | A1* | 3/2020 | Zander | B60T 8/368 |

FOREIGN PATENT DOCUMENTS

| | | |
|---|---|---|
| DE | 10 2006 059 924 A1 | 6/2008 |
| DE | 10 2010 040 868 A1 | 3/2012 |
| DE | 10 2012 223 059 A1 | 6/2014 |
| DE | 10 2013 209 727 A1 | 11/2014 |
| DE | 10 2014 207 545 A1 | 10/2015 |
| DE | 10 2014 208 871 A1 | 11/2015 |
| DE | 10 2014 212 385 A1 | 12/2015 |
| DE | 10 2014 213 732 A1 | 1/2016 |
| DE | 10 2015 205 543 A1 | 9/2016 |
| JP | H10-329699 A | 12/1998 |
| JP | H11-208440 A | 8/1999 |
| JP | 2002-308078 A | 10/2002 |
| JP | 2006-111245 A | 4/2006 |
| JP | 2009-126378 A | 6/2009 |
| JP | 2014-046915 A | 3/2014 |

* cited by examiner

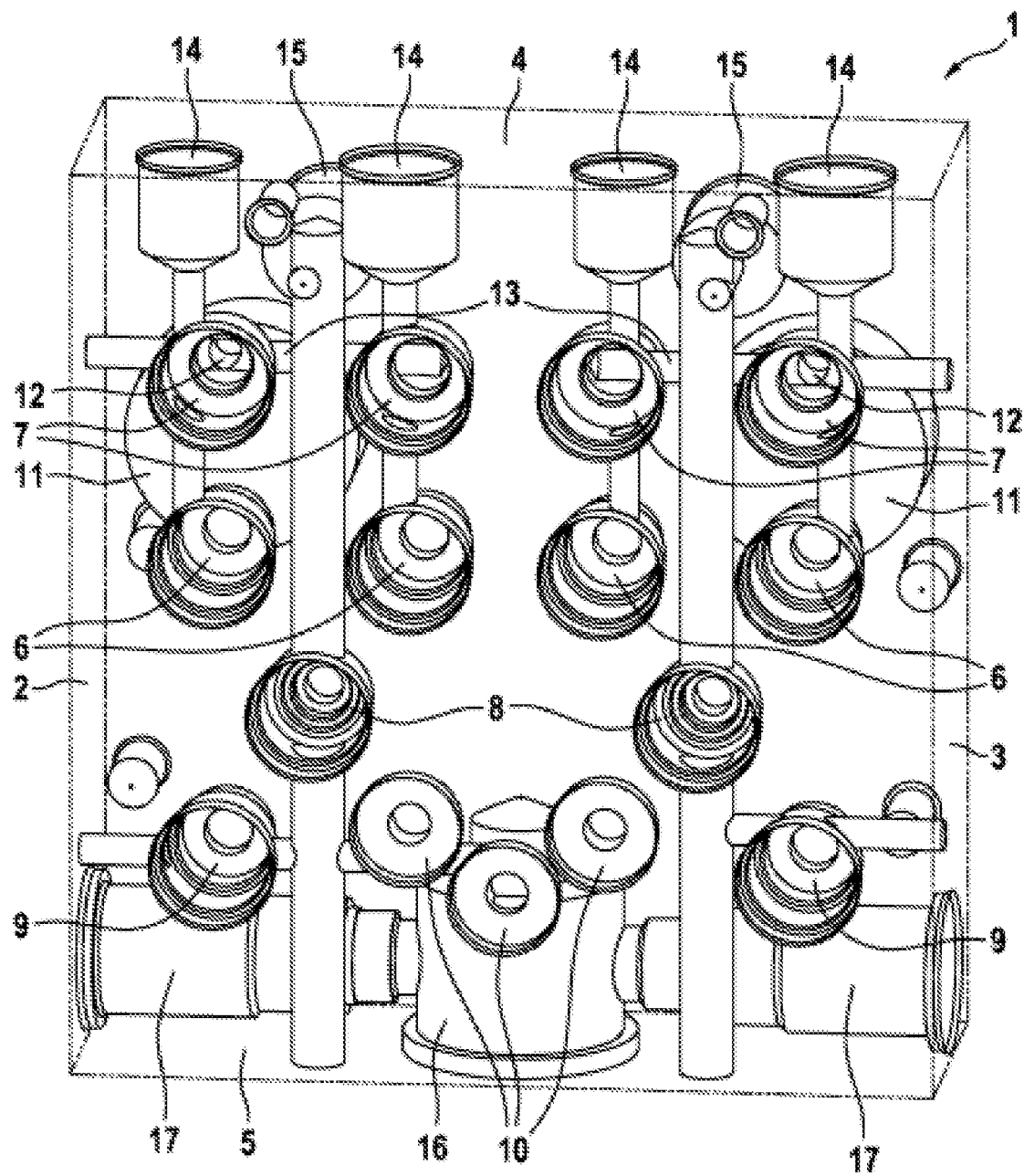

HYDRAULIC BLOCK FOR A HYDRAULIC ASSEMBLY OF A SLIP CONTROL SYSTEM OF A HYDRAULIC VEHICLE BRAKE SYSTEM

This application is a 35 U.S.C. § 371 National Stage Application of PCT/EP2017/076709, filed on Oct. 19, 2017, which claims the benefit of priority to Serial No. DE 10 2016 225 761.7, filed on Dec. 21, 2016 in Germany, the disclosures of which are incorporated herein by reference in their entirety.

The disclosure relates to a hydraulic block for a hydraulic assembly of a slip control system of a hydraulic vehicle brake system having a valve side which has receptacles for solenoid valves.

Slip control systems are, for example, antilock brake systems, traction control systems and/or vehicle dynamics management/electronic stability programs, for which the abbreviations ABS, TCS, VDM/ESP are commonly used. Such slip control systems of hydraulic vehicle brake systems are known from automobiles and motorcycles and are not explained in more detail here.

BACKGROUND

The core of such slip control systems is a hydraulic assembly, which has a hydraulic block which is equipped with hydraulic components of the slip control system and is connected to a master brake cylinder by brake lines and to which one or more hydraulic wheel brakes are connected by brake lines. Hydraulic components are, amongst other things, solenoid valves, hydraulic pumps (most commonly piston pumps), non-return valves, hydraulic accumulators, damper chambers and pressure sensors. The hydraulic block is typically a box-shaped metal block, which serves for the mechanical fastening and hydraulic wiring of the hydraulic components of the slip control system. Wiring means the hydraulic connection of the hydraulic components according to a hydraulic circuit diagram of the slip control system.

The hydraulic block has receptacles for the hydraulic components of the slip control system. This usually refers to cylindrical countersinks, blind or through holes, most commonly with a stepped diameter, which are incorporated in the hydraulic block and into which the hydraulic components are fully or partially introduced, for example pressed. For example, hydraulic pumps are usually fully introduced into their receptacles in a hydraulic block, whereas, in the case of solenoid valves, only a hydraulic part is usually introduced into a receptacle of a hydraulic block and an electromagnetic part of the solenoid valve protrudes from the hydraulic block. The receptacles are connected to one another according to the hydraulic circuit diagram of the slip control system by a normally Cartesian bore arrangement of the hydraulic block. Cartesian bored means that bores are incorporated in the hydraulic block such that they are parallel or at a right angle to one another and to surfaces and edges of the hydraulic block. Equipped with the hydraulic components, the hydraulic block forms a hydraulic assembly.

For connecting the hydraulic block to a master brake cylinder and for connecting hydraulic wheel brakes to the hydraulic block, known hydraulic blocks have connections for brake lines. The connections are typically cylindrical countersinks or blind holes which have, for example, an internal thread for screw connection to a screw nipple of a brake line or are threadless for pressing-in and caulking a press-in nipple of a brake line, preferably in a so-called self-clinch technique. Self-clinch means that, when pressed into the connection of the hydraulic block, the press-in nipple is caulked in the connection of the hydraulic block in a pressure-tight manner under plastic deformation of the material of the hydraulic block itself.

Published patent application DE 10 2006 059 924 A1 discloses a hydraulic block for a hydraulic assembly of a slip control system of a hydraulic vehicle brake system, in which all receptacles for solenoid valves of the slip control system are arranged in a cover side, which can also be referred to as the valve side, of a box-shaped hydraulic block. The cover side is one of the two large sides of the box-shaped hydraulic block, which is not cube-shaped but is longer and wider than it is thick. The cover side can be square or rectangular.

In the known hydraulic block, connections for brake lines which lead to hydraulic wheel brakes are incorporated in a transverse side, which can also be referred to as the connection side. The connection side adjoins the valve side. Receptacles for hydraulic accumulators are arranged in a transverse side of the known hydraulic block which is opposite the connection side and likewise adjoins the valve side.

SUMMARY

The hydraulic block according to the disclosure is provided for a hydraulic assembly of a slip control system of a hydraulic vehicle brake system. The, in particular, box-shaped hydraulic block has receptacles for solenoid valves of the slip control system on one side, which is referred to as the valve side here. The valve side is, in particular, one of the two large sides of the hydraulic block. On a side which is opposite the valve side, the hydraulic block according to the invention disclosure has at least one receptacle for a hydraulic accumulator. In particular, the hydraulic block has one or even more hydraulic accumulators for each brake circuit. The at least one hydraulic accumulator can be arranged countersunk, partially countersunk and partially protruding or even fully protruding on the hydraulic block.

An advantage of the disclosure is the capacity for the at least one hydraulic accumulator to be vented, or vented more easily, in a hydraulic block which is arranged upright when the at least one hydraulic accumulator is arranged opposite the valves on or in the hydraulic block. Arranged upright means with a vertical valve side, which is a typical position for installing a hydraulic block in an engine compartment of an automobile.

A further advantage of the disclosure is the option of arranging the at least one receptacle for a hydraulic accumulator such that it covers one or more of the opposite receptacles for solenoid valves, namely for outlet valves of the slip control system, as seen perpendicularly to the valve side. An outlet valve of a slip control system connects a wheel brake to a hydraulic accumulator. A receptacle for an outlet valve is therefore connected to a connection for a wheel brake by a bore arrangement of the hydraulic block.

With an arrangement of a receptacle for a hydraulic accumulator in the hydraulic block which, as seen perpendicularly to the valve side, covers at least one receptacle for an outlet valve, the at least one receptacle for a hydraulic accumulator can be connected to one or more of the receptacles for an outlet valve or outlet valves by a short bore perpendicular to the valve side. The bore is part of the bore arrangement of the hydraulic block. This results in a short coupling of the at least one hydraulic accumulator to at least one outlet valve and a short venting path.

Wheel brakes are connected to the slip control system by inlet valves and the outlet valves. The inlet valves and the outlet valves form wheel brake pressure-modulation valve arrangements with which wheel brake pressures in the wheel brakes can be controlled individually for each wheel for slip control. Like a receptacle for an outlet valve, a receptacle for an inlet valve is connected to a connection for a wheel brake by the bore arrangement of the hydraulic block.

The disclosure includes further advantageous configurations and further developments of the hydraulic block disclosed herein.

The receptacles for the solenoid valves are preferably arranged in rows parallel to a connection side of the hydraulic block, which has at least one connection for a master brake cylinder or a wheel brake. In this case, in particular, receptacles of similar solenoid valves are arranged in a row in each case, i.e. the receptacles for the inlet valves in one row and the receptacles for the outlet valves in another row.

In comparison to a usual arrangement, the row having the receptacles for the inlet valves and the row for the outlet valves are swapped: the receptacles for outlet valves are located in a first row near to the connection side having the connections for the master brake cylinder or the wheel brakes and the inlet valves are located in a second row further away from the connection side of the hydraulic block.

In contrast to the prior art, hydraulic pumps of the slip control system are preferably not provided in a central region of the hydraulic block but near to a transverse side, opposite the connection side, in the hydraulic block. An electric motor for driving the hydraulic pumps is preferably not incorporated opposite the valve side but on the transverse side of the hydraulic block which is opposite the connection side and adjoining the valve side.

A bore is understood to be a through-hole or a blind hole, irrespective of the manner in which it is produced. Therefore, a bore does not have to be produced by boring, but can be produced, for example, by milling or in another manner.

BRIEF DESCRIPTION OF THE DRAWING

The disclosure is explained in more detail below with reference to an embodiment illustrated in the drawing. The single FIGURE shows a hydraulic block according to the disclosure in a perspective illustration. The hydraulic block is drawn transparently to show its bore arrangement, which is illustrated in part.

DETAILED DESCRIPTION

The hydraulic block 1 according to the disclosure, which is drawn transparently, is provided for a hydraulic assembly of a slip control system of a hydraulic vehicle brake system which is otherwise not illustrated. Such slip control systems are, for example, antilock brake systems, traction control systems and/or vehicle dynamics management/electronic stability programs, for which the abbreviations ABS, TCS, VDM/ESP are commonly used. The hydraulic block 1 is a box-shaped metal block. It has a rectangular base side and a congruent cover side, opposite the base side, which are referred to here as accumulator side and as valve side 2, two mutually opposing longitudinal sides 3 and two likewise mutually opposing transverse sides, which are referred to here as connection side 4 and as motor side 5. The accumulator side and the valve side 2 are the two large sides of the hydraulic block 1. The longitudinal sides 3 do not have to be longer than the transverse sides.

The hydraulic block 1 is provided for a vehicle brake system having a dual-circuit master brake cylinder (not illustrated) and four hydraulic wheel brakes (likewise not shown). The vehicle brake system has two brake circuits, each with two wheel brakes.

In the valve side 2, the hydraulic block 1 has receptacles 6, 7, 8, 9 for solenoid valves (not shown) of the slip control system; more precisely, four receptacles for inlet valves and four receptacles 7 for outlet valves. Furthermore, the hydraulic block 1 has two receptacles 8 for intake valves and two receptacles 9 for isolation valves in the valve side 2 and receptacles 10 for pressure sensors. In the valve side 2 of the hydraulic block 1, the four receptacles 7 for the outlet valves are incorporated in a first row parallel to the connection side 4 and the four receptacles 6 for the inlet valves are incorporated in a second row, likewise parallel to the connection side 4. The first row having the receptacles 7 for the outlet valves is located near to the connection side 4 of the hydraulic block 1 or in any case nearer to the connection side 4 than the second row having the receptacles 6 for the inlet valves, which are located on a side of the first row having the receptacles 7 for the outlet valves which is remote from the connection side 4 of the hydraulic block 1. The receptacles 8 for the intake valves, the receptacles 9 for the isolation valves and the receptacles 10 for the pressure sensors are incorporated between the second row having the receptacles 6 for the inlet valves and the motor side 5 in the valve side 2 of the hydraulic block 1.

The receptacles 6, 7, 8, 9 for the solenoid valves are cylindrical countersinks in the hydraulic block 1, which have a stepped diameter and into which the solenoid valves (not illustrated) of the slip control system are pressed in a so-called self-clinch technique. This means that, when pressed in, the solenoid valves plastically deform material of the hydraulic block 1 so that they are held mechanically and sealed in the receptacles 6, 7, 8, 9 in a pressure-tight manner. The receptacles 10 for the pressure sensors are low cylindrical countersinks, into which the pressure sensors (not illustrated) are inserted and caulked in a pressure-tight manner.

In the accumulator side, which is opposite the valve side 2 and is remote from the viewer in the drawing, the hydraulic block 1 has two cylindrical countersinks as receptacles 11 for hydraulic accumulators. The receptacles 11 for the hydraulic accumulators have a larger diameter and are deeper than the receptacles 6, 7, 8, 9 for the solenoid valves. Shape and size are not critical for the receptacles 11. The receptacles 11 for the hydraulic accumulators are arranged so that, as seen perpendicularly to the valve side 2 and the accumulator side, they cover at least a respective receptacle 7 for the outlet valves. In the embodiment of the disclosure which is illustrated and described, the receptacles 11 for the hydraulic accumulator cover outer receptacles 7 for outlet valves, i.e. receptacles nearer to the longitudinal sides 3 of the hydraulic block 1. Each of the two receptacles 11 for a hydraulic accumulator is connected to a receptacle 7 for an outlet valve by bores 12 perpendicular to the valve side 2 and the accumulator side. The two other receptacles 7 for outlet valves are connected to the outer receptacles 7 for outlet valves, and thus likewise to a respective receptacle 11 for a hydraulic accumulator 11, by bores 13 parallel to the valve side 2 to the connection side 4 of the hydraulic block 1.

In the connection side 4, adjoining the valve side 2, of the hydraulic block 1, four connections 14 for the hydraulic wheel brakes (not shown) are incorporated next to one another in a row. Near to the connection side 4, two connections 15 for the dual-circuit master brake cylinder (likewise not shown) are incorporated in the accumulator side. The connections 14, 15 are cylindrical countersinks, for example with internal threads for the screw connection of brake lines to screw nipples or without an internal thread for the connection of brake lines by caulking press-in nipples. Caulking can take place in a so-called self-clinch technique with press-in nipples which, when the press-in nipples are pressed into the connection bores 14, 15, deform the material of the hydraulic block 1 so that the press-in nipples are held mechanically and sealed in the connections 14, 15 in a pressure-tight manner.

In the motor side 5, which is opposite the connection side 4, the hydraulic block 1 has, in its longitudinal center, an eccentric chamber 16 which, in the embodiment of the disclosure shown, is a cylindrical countersink with a stepped diameter, said diameter being greater and the countersink being deeper than the receptacles 6, 7, 8, 9 for the solenoid valves. The eccentric chamber 16 is provided for installing and pivotally mounting a pump eccentric (not shown) for driving two piston pumps as hydraulic pumps of the slip control system of the hydraulic vehicle brake system (not shown). The pump eccentric is driven by an electric motor (not shown) as a pump motor, optionally with an interconnected mechanical reduction gear. The electric motor (not shown) is fastened externally on the motor side 5.

Two receptacles 17 for piston pumps as hydraulic pumps of the slip control system are incorporated in the hydraulic block 1 radially with respect to the eccentric chamber 16 and coaxially opposite one another, which receptacles open into the two longitudinal sides 3. The receptacles 17 for the piston pumps are cylindrical holes, which have a stepped diameter and continue from the longitudinal sides 3 to the eccentric chamber 16. They are provided for installing piston pumps (not illustrated) as hydraulic pumps of the slip control system of the hydraulic vehicle brake system (not illustrated). As seen in a longitudinal direction of the hydraulic block 1, the receptacles 17 for the piston pumps are located between the receptacles 6, 7 for the inlet valves and the outlet valves and the motor side 5 or between the receptacles 6, 7, 8, 9 for the solenoid valves and the motor side 5.

The hydraulic block 1 is bored symmetrically with respect to a longitudinal center plane, which means that the receptacles 6, 7, 8, 9, 10, 11 for the solenoid valves, the pressure sensors and the hydraulic accumulators of the slip control system, the receptacles 17 for the piston pumps and the eccentric chamber 16, the connections 14, 15 for the wheel brakes and the master brake cylinder and bores 12, 13 connecting the receptacles are incorporated in the hydraulic block 1 mirror-symmetrically with respect to the longitudinal center plane. The longitudinal center plane is located in a center between the two longitudinal sides 3. Individual departures from the symmetry are not excluded.

Fitted with the (not illustrated) solenoid valves, pressure pumps, hydraulic accumulators and piston pumps and further hydraulic components of a slip control system of a hydraulic vehicle brake system (not illustrated), the hydraulic block 1 forms a hydraulic assembly which is the core of a hydraulic part of the slip control system. The hydraulic block 1 is drawn upright, i.e. the connection side 4 is located at the top and the motor side 5 at the bottom and the valve side 2 and the accumulator side are vertical. This is also an intended position for installing and using and operating the hydraulic block 1 fitted with the hydraulic components of the slip control system.

The invention claimed is:
1. A hydraulic block for a hydraulic assembly of a slip control system of a hydraulic vehicle brake system, comprising:
 a valve side including a plurality of first receptacles configured for solenoid valves;
 an accumulator side opposite the valve side including at least one second receptacle configured for a hydraulic accumulator;
 a connection side adjoining the valve side;
 at least one connection on the connection side and configured to connect to a master brake cylinder or a hydraulic wheel brake;
 a motor side opposite the connection side; and
 an eccentric chamber defined in the motor side and configured for a pump eccentric that is configured to drive a hydraulic pump in the motor side.

2. The hydraulic block as claimed in claim 1, wherein an outlet valve receptacle of the plurality of first receptacles that is configured for an outlet valve is located between the connection side and an inlet valve receptacle of the plurality of first receptacles that is configured for an inlet valve.

3. A hydraulic block for a hydraulic assembly of a slip control system of a hydraulic vehicle brake system, comprising:
 a valve side including a plurality of first receptacles configured for solenoid valves;
 an accumulator side opposite the valve side including at least one second receptacle configured for a hydraulic accumulator;
 a connection side adjoining the valve side;
 at least one connection on the connection side and configured to connect to a master brake cylinder or a hydraulic wheel brake;
 a motor side opposite the connection side; and
 at least one third receptacle configured to receive a hydraulic pump and arranged between the plurality of first receptacles for solenoid valves and the motor side.

4. A hydraulic block for a hydraulic assembly of a slip control system of a hydraulic vehicle brake system, comprising:
 a valve side including a plurality of first receptacles configured for solenoid valves;
 an accumulator side opposite the valve side including at least one second receptacle configured for a hydraulic accumulator;
 a connection side adjoining the valve side; and
 at least one connection on the connection side and configured to connect to a master brake cylinder or a hydraulic wheel brake,
 wherein an outlet valve receptacle of the plurality of first receptacles that is configured for an outlet valve is located between the connection side and an inlet valve receptacle of the plurality of first receptacles that is configured for an inlet valve.

5. The hydraulic block as claimed in claim 4, wherein, when viewing the hydraulic block perpendicularly to the valve side or to the accumulator side, the at least one second receptacle covers at least one receptacle of the plurality of first receptacles that is configured for an outlet valve.

6. The hydraulic block as claimed in claim 5, further comprising:
 a bore in the hydraulic block that connects the at least one second receptacle to an outlet valve receptacle of the plurality of first receptacles configured for an outlet valve,
 wherein the bore is perpendicular to the valve side or to the accumulator side.

7. The hydraulic block as claimed in claim 4, wherein the plurality of first receptacles for the solenoid valves are arranged in rows parallel to the connection side.

* * * * *